US009616841B2

(12) United States Patent
Futai et al.

(10) Patent No.: US 9,616,841 B2
(45) Date of Patent: Apr. 11, 2017

(54) SIDE AIRBAG DEVICE

(71) Applicant: MITSUBISHI JIDOSHA KOGYO KABUSHIKI KAISHA, Tokyo (JP)

(72) Inventors: Takaaki Futai, Nagoya (JP); Naoki Fujisawa, Okazaki (JP); Shinya Nakamura, Anjo (JP); Hiroyuki Suzuki, Okazaki (JP); Toshihide Nishimura, Kawasaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/165,827

(22) Filed: May 26, 2016

(65) Prior Publication Data

US 2016/0272144 A1    Sep. 22, 2016

Related U.S. Application Data

(63) Continuation of application No. PCT/JP2014/081238, filed on Nov. 26, 2014.

(30) Foreign Application Priority Data

Nov. 29, 2013 (JP) .................................. 2013-247503

(51) Int. Cl.
*B60R 21/231* (2011.01)
*B60R 21/233* (2006.01)
(Continued)

(52) U.S. Cl.
CPC ...... *B60R 21/23138* (2013.01); *B60R 21/233* (2013.01); *B60R 21/239* (2013.01);
(Continued)

(58) Field of Classification Search
CPC ............ B60R 21/23138; B60R 21/233; B60R 2021/26094; B60R 2021/23146
See application file for complete search history.

(56) References Cited

U.S. PATENT DOCUMENTS

| 2005/0184493 A1 | 8/2005 | Hofmann et al. |
| 2007/0145729 A1 | 6/2007 | Ishiguro et al. |
| (Continued) | | |

FOREIGN PATENT DOCUMENTS

| JP | 2007-1362 A | 1/2007 |
| JP | 2007-83835 A | 4/2007 |
| (Continued) | | |

*Primary Examiner* — Darlene P Condra
(74) *Attorney, Agent, or Firm* — Birch, Stewart, Kolasch & Birch, LLP

(57) ABSTRACT

A side airbag device includes an airbag which includes a first base fabric and a second base fabric constituting an inflatable envelope, and in the event of a lateral collision of a vehicle, the airbag is deployed between an occupant and a door. The airbag further includes a partition fabric between the first base fabric and the second base fabric. The partition fabric partitions the inflatable envelope into a first inflatable compartment corresponding to a shoulder of the occupant, and a second inflatable compartment. The partition fabric is provided with a valve mechanism which opens to connect the first inflatable compartment and the second inflatable compartment when the first inflatable compartment is fully inflated.

6 Claims, 11 Drawing Sheets

(51) Int. Cl.
  *B60R 21/239* (2006.01)
  *B60R 21/26* (2011.01)
(52) U.S. Cl.
  CPC ........ *B60R 2021/23146* (2013.01); *B60R 2021/23324* (2013.01); *B60R 2021/26094* (2013.01)

(56) References Cited

U.S. PATENT DOCUMENTS

| | | |
|---|---|---|
| 2012/0025499 A1 | 2/2012 | Shibayama et al. |
| 2012/0200072 A1 | 8/2012 | Fukawatase et al. |
| 2012/0217731 A1* | 8/2012 | Baba ............... B60R 21/233 280/730.2 |
| 2012/0248746 A1* | 10/2012 | Yamamoto ........ B60R 21/23138 280/729 |
| 2013/0200597 A1 | 8/2013 | Honda et al. |
| 2014/0159354 A1 | 6/2014 | Fujiwara |
| 2014/0208567 A1* | 7/2014 | Hotta ............... B60R 21/2346 29/428 |
| 2014/0210192 A1* | 7/2014 | Hotta ............... B60R 21/23138 280/730.2 |
| 2015/0115583 A1* | 4/2015 | Azuma ............ B60R 21/231 280/740 |
| 2015/0217716 A1* | 8/2015 | Anderson .......... B60R 21/2338 280/729 |

FOREIGN PATENT DOCUMENTS

| | | |
|---|---|---|
| JP | 2007-307990 A | 11/2007 |
| JP | 2010-120505 A | 6/2010 |
| JP | 2012-46167 A | 3/2012 |
| JP | 5252000 B2 | 7/2013 |
| JP | 2013-159305 A | 8/2013 |
| WO | WO 2013/014773 A1 | 1/2013 |
| WO | WO 2014/098027 A1 | 6/2014 |

* cited by examiner

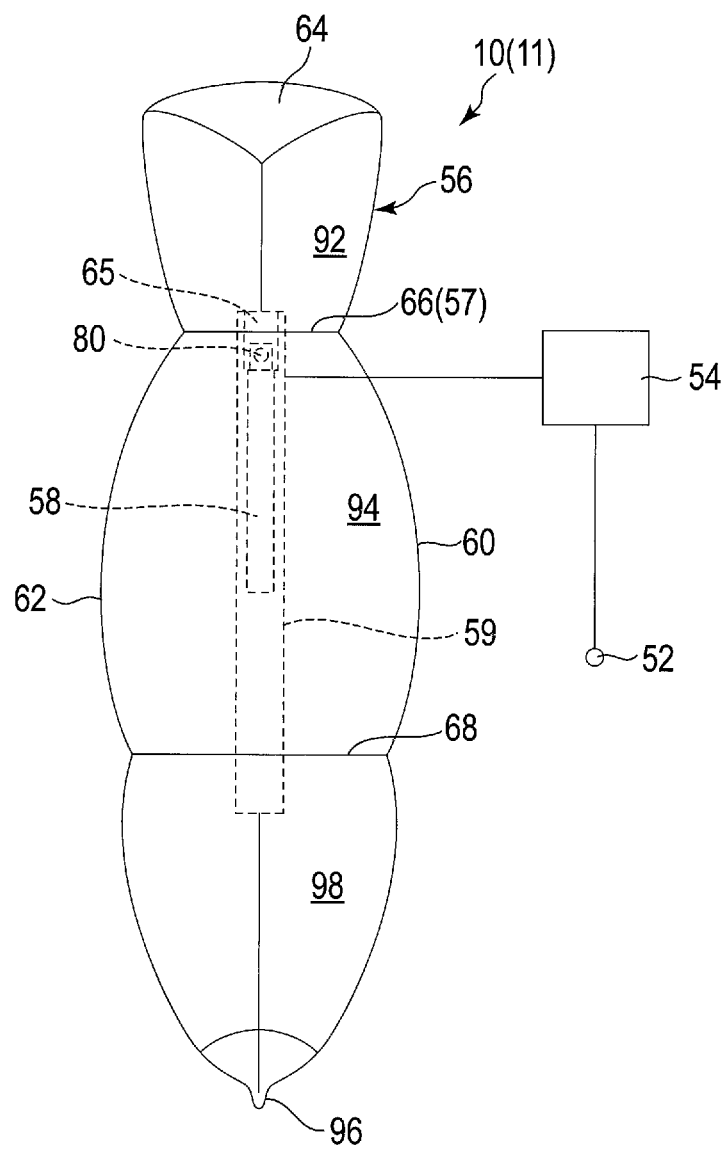
F I G. 3

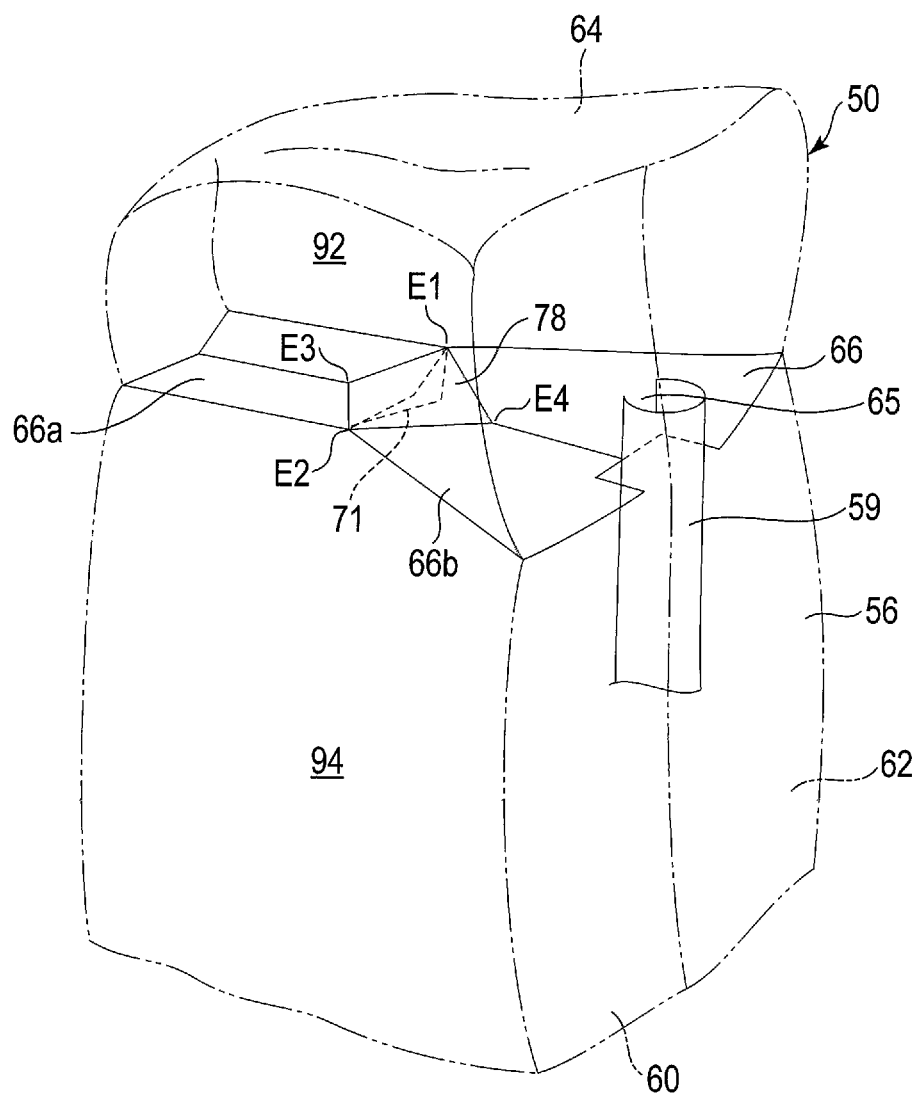
F I G. 11

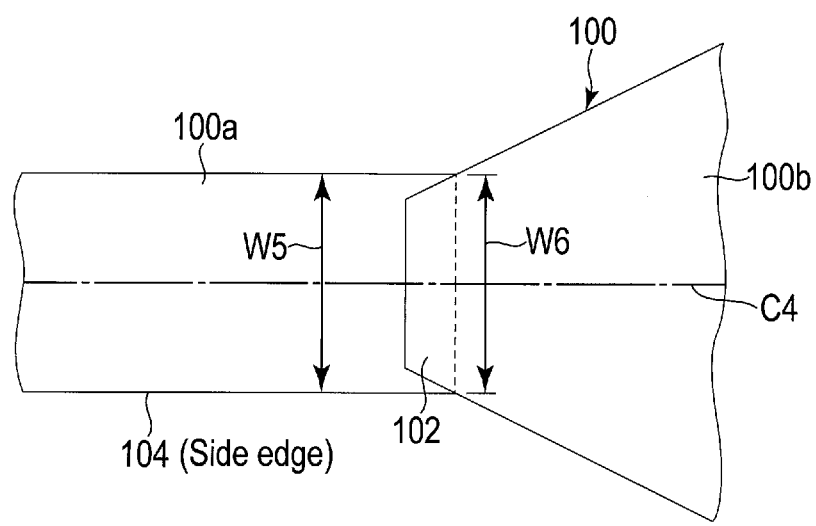
F I G. 17

SIDE AIRBAG DEVICE

CROSS REFERENCE TO RELATED APPLICATIONS

This application is a Continuation application of PCT Application No. PCT/JP2014/081238, filed Nov. 26, 2014 and based upon and claiming the benefit of priority from prior Japanese Patent Application No. 2013-247503, filed Nov. 29, 2013, the entire contents of all of which are incorporated herein by reference.

BACKGROUND OF THE INVENTION

1. Field of the Invention

Embodiments described herein relate generally to a side airbag device configured to deploy an airbag at the side of a vehicle seat.

2. Description of the Related Art

It is known that side airbag devices installed in vehicles are effective in protecting mainly the sides of seated occupants by deploying airbags between the occupants and the doors in the event of lateral collisions or the like.

The shoulder of the seated occupant is closer to the door than the other parts of the body such as a waist and an abdomen. Therefore, to protect the shoulder, it is preferable to inflate the portion corresponding to the shoulder of the side airbag more quickly than the other portions.

Further, it is also known that the side airbag is more effective in protecting the occupant in the event of a lateral collision if the side airbag is deployed in such a manner as to receive parts of the body near the shoulder blade of the occupant. Still further, there is a technique of deploying the airbag according to the body size of the occupant.

CITATION LIST

Patent Literature

Patent Literature 1: JP 2013-159305 A
Patent Literature 2: WO 2013/014773 A1
Patent Literature 3: JP 5252000 B

BRIEF SUMMARY OF THE INVENTION

Technical Problem

A conventional side airbag is formed in the shape of a bag, and has a greater thickness in a center portion and a smaller thickness in a peripheral portion. Therefore, to reliably protect the shoulders of an occupant, it is necessary to increase the thickness of an upper portion of the side airbag which receives the shoulder of the occupant.

However, in the case of enlarging the side airbag upward to increase the thickness of the upper portion, the side airbag increases in volume and size, and consequently, it takes time for the side airbag to inflate fully. Further, there is a side airbag provided with a base fabric at the upper end, that is, a side airbag having an upper portion flattened. However, if the thickness of the side airbag is set to be a thickness appropriate for the shoulders, it is difficult to ensure a sufficient thickness for the other parts of the body.

Still further, there is also a side airbag having a back portion which receives the shoulder blade closer to the inside of the vehicle, but in this case, it is necessary to manufacture a side airbag for a left seat and a side airbag for a right seat, respectively. Still further, it is difficult to keep the structure of the airbag simple to deploy the airbag according to the body size of the occupant.

An object of an embodiment is to solve the above-described technical problems and provide a side airbag device which can protect an occupant more reliably in the event of a lateral collision of a vehicle.

Solution to Problem

To solve the above-described technical problems, a side airbag device of an embodiment configured to deploy an airbag between an occupant and a door and comprises an airbag including: a first base fabric constituting one of right and left side surfaces of the airbag; and a second base fabric opposed to the first base fabric, constituting the other of the right and left side surfaces of the airbag, and constituting an inflatable envelope together with the first base fabric. Further, the airbag further includes: a partition fabric provided between the first base fabric and the second base fabric, attached to the first base fabric and the second base fabric at side edges, and partitioning the inflatable envelope into a first inflatable compartment corresponding to a shoulder of the occupant and a second inflatable compartment; and a valve mechanism provided in the partition fabric and configured to open to connect the first inflatable compartment and the second inflatable compartment only when the first inflatable compartment is fully inflated.

Advantageous Effects of Invention

According to the present embodiment, it is possible to provide a side airbag device having a simple structure and capable of protecting an occupant more reliably in the event of a lateral collision of a vehicle.

BRIEF DESCRIPTION OF THE SEVERAL VIEWS OF THE DRAWING

FIG. 3 is a front view of the fully inflated airbag of the side airbag device.

FIG. 11 is a perspective view of the side airbag in a state where the first inflatable compartment is in the middle of inflation.

FIG. 17 is a plan view of a partition fabric of an airbag device of another embodiment.

DETAILED DESCRIPTION OF THE INVENTION

Figure 1:
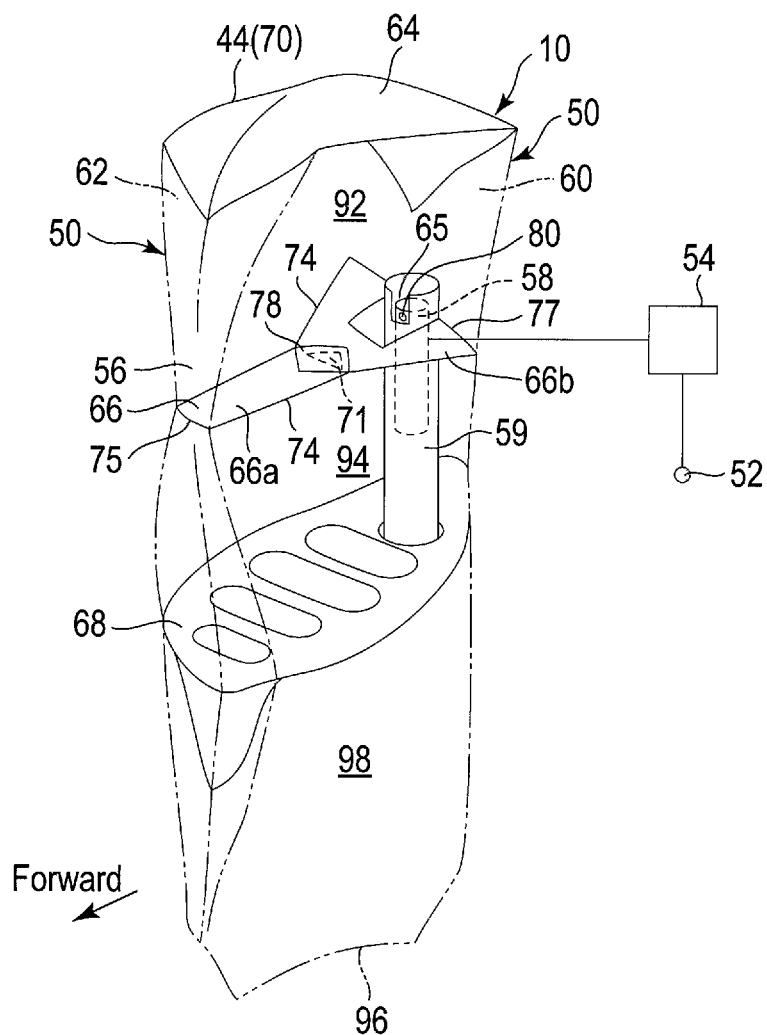
FIG. 1 is a perspective view of a fully-inflated airbag of a side airbag device of an embodiment.
Figure 2:
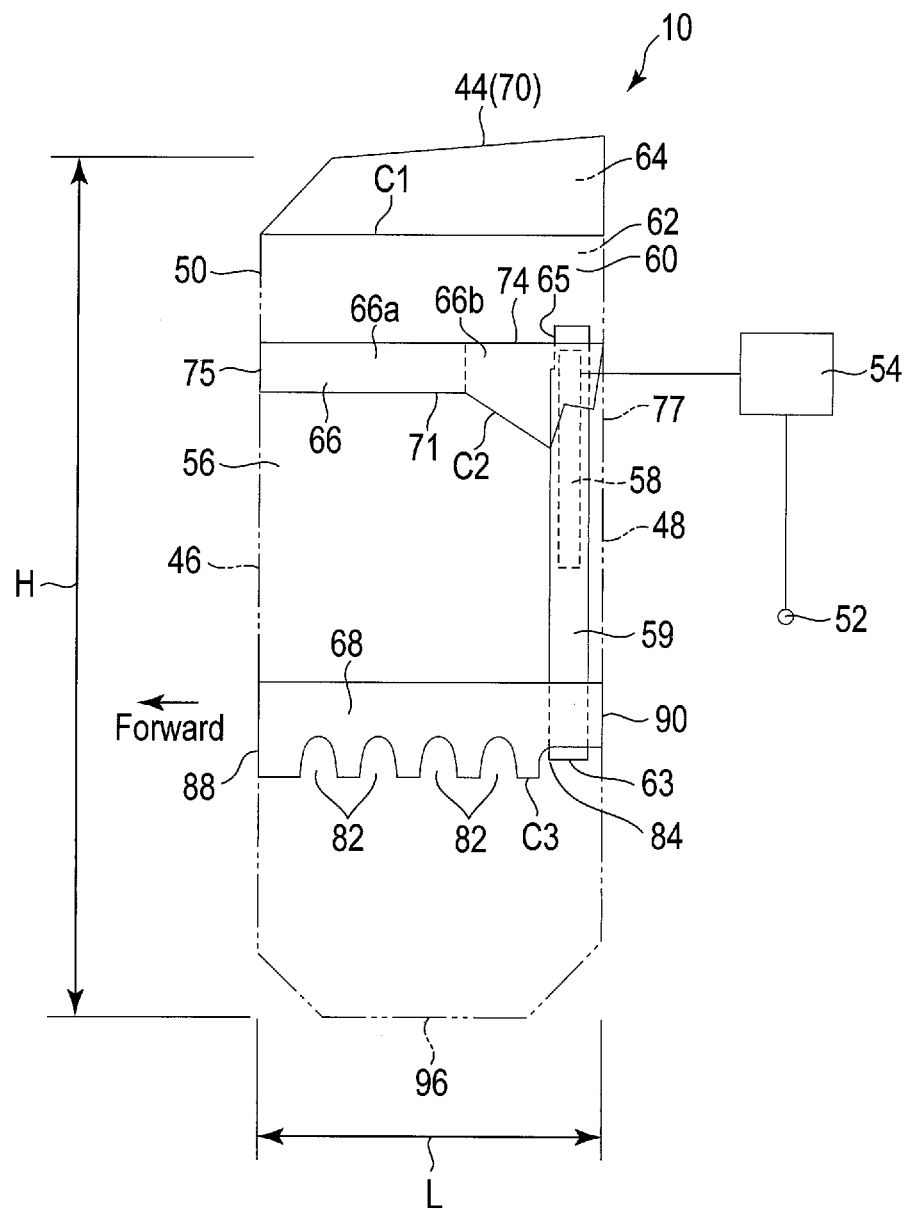
FIG. 2 is a perspective view of the airbag of the side airbag device not inflated yet.

A side airbag device of an embodiment will be described below. FIG. 1 is a perspective view of a side airbag device 10 in a state where an airbag is fully inflated. FIG. 2 is a side view of the side airbag device 10 in a state where an airbag 56 is not fully inflated yet (is just deployed). FIG. 3 is a front view of the side airbag device 10 in a state where the airbag 56 is fully inflated.

The following description will be based on the assumption that, in the side airbag device 10, the forward direction is the direction of travel of the vehicle and the backward direction is the opposite direction, and the right and left sides of the side airbag device 10 are determined, accordingly. Further, it is assumed that the downward direction is the direction of gravity and the upward direction is the opposite direction, and that the inner side is the inner side of the vehicle and the outer side is the opposite side.

First Embodiment

Figure 4:
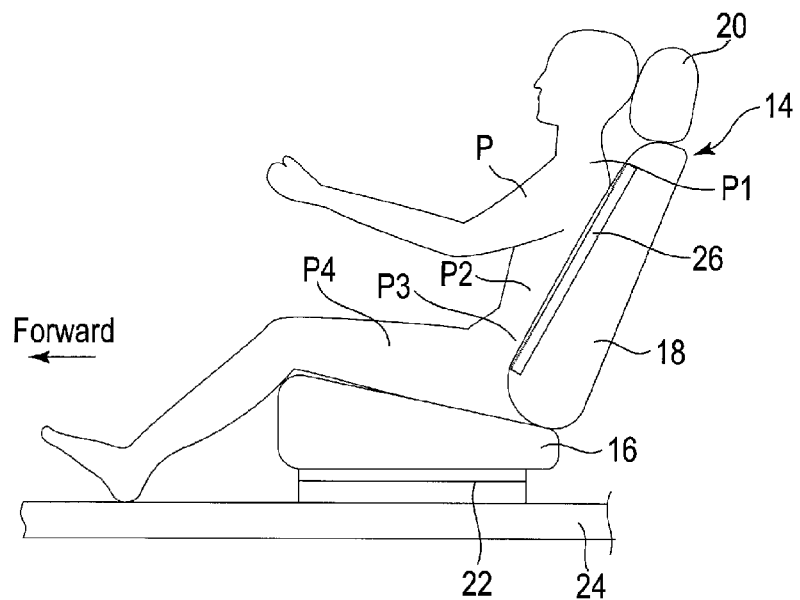
FIG. 4 is a side view of a state where an occupant is in a seat equipped with the side airbag device.

The vehicle side airbag device 10 comprises, as shown in FIGS. 1 and 2, an airbag module 50, a collision detector 52, and a controller 54. The airbag module 50 is installed in a seat 14 of the vehicle (FIG. 4). The seat 14 is a front seat of the vehicle and is installed in such a manner as to face forward.

Note that the seat 14 is assumed to be a seat of an automobile but this is in no way restrictive. Further, the seat 14 equipped with the side airbag device 10 is not necessarily a front seat of a vehicle. The side airbag devices 10 are installed in the seats 14 on both sides of the vehicle substantially symmetrically with respect to each other, but only the side airbag device 10 installed in the seat 14 on the left side of the vehicle, that is, on the right hand side when viewed from the front of the vehicle will be described below.

Figure 5:
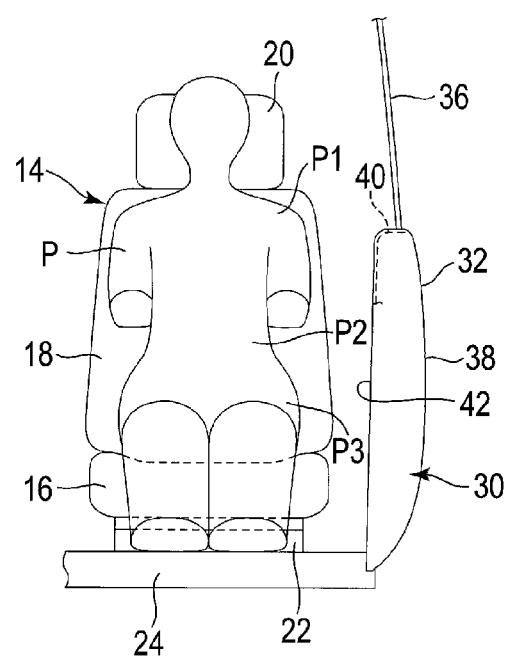
FIG. 5 is a front view of a state where the occupant is in the seat.

FIGS. 4 and 5 show a state where an occupant P is in the seat 14. The seat 14 comprises a seat cushion (seating portion) 16, a seatback (backrest portion) 18, and a headrest 20. At the side of the seat 14, as shown in FIG. 5, there is a door 30. The door 30 is attached to the vehicle in an openable and closable manner. The door 30 comprises a door body 32 and a window glass 36. The door body 32 comprises a door outer panel 38, a door inner panel 40, and a door trim 42. The door outer panel 38 is on the outer side of the vehicle. The door inner panel 40 and the door trim 42 are attached to the door outer panel 38 on the inner side, more specifically, on the inner side of the vehicle.

The seat cushion 16 is attached to the floor of the vehicle via a leg 22. Between the seat cushion 16 and the leg 22, a seat position adjustment mechanism is provided. The seat position adjustment mechanism is configured to support the seat cushion 16 in such a manner that the position of the seat cushion 16 can be adjusted forward and backward or upward and downward and to secure the seat cushion 16 in a desired state.

The seatback 18 is attached to the seat cushion 16 via a reclining mechanism. The reclining mechanism is configured to support the seatback 18 in such a manner that the angle of the seatback 18 with respect to the seat cushion 16 can be adjusted forward and backward, and to secure the seatback 18 in a desired position. The airbag module 50 is provided in the seatback 18.

The airbag module 50 comprises, as shown in FIGS. 1 and 2, the airbag 56 and a gas generator 58. The collision detector 52 and the controller 54 are, for example, attached to the vehicle.

The collision detector 52 is configured to detect acceleration produced at the instant of an accident or the like and to transmit a detection signal to the controller 54. On receiving the detection signal from the collision detector 52, the controller 54 compares with a stored threshold value, and if the acceleration exceeds the threshold value, transmits an operation signal to the gas generator 58.

The gas generator 58 is also called an inflator and comprises a combustible material and an igniter. The gas generator 58 is provided in the airbag 56 and is configured, when receiving the operation signal from the controller 54, to operate the igniter to ignite the combustible material. The combustible material generates gas as it combusts, and the generated gas is supplied to the airbag 56 from a discharge nozzle 80. The discharge nozzle 80 is provided in the upper portion of the gas generator 58 in such a manner as to face forward. That is, the gas generator 58 is configured to discharge gas above a first partition fabric 66, which will be described later, in the forward direction. Note that the gas generator 58 may be configured to store compressed gas in a tank or the like and to release the compressed gas in response to the operation signal.

The airbag module 50 is secured to the inner side of the seatback 18 with the airbag 56 folded. The seatback 18 has, as shown in FIG. 4, an opening portion 26 at the front side edge on the side of the door 30. The opening portion 26 is normally closed with an attachment member, but when the side airbag device 10 is operated and the airbag 56 is deployed, the attachment member breaks up, and the opening portion 26 opens.

The fully inflated airbag 56 comprises, as shown in FIGS. 1 and 3, a first base fabric 60 on the right hand side, a second base fabric 62 on the left hand side, and an upper fabric 64 on top when viewed from the front. Further, the first partition fabric 66 and a second partition fabric 68 are provided between the first base fabric 60 and the second base fabric 62 to vertically partition the airbag 58. Still further, at the back end of the airbag 56, a tubular member 59 extending vertically across a first inflatable compartment 92 to a third inflatable compartment 98 is provided. Note that the gas generator 58 is accommodated in the tubular member 59 in a state where the discharge nozzle 80 is in the vicinity of the first partition fabric 66.

In the airbag 56, the inflatable envelope is vertically partitioned into the first inflatable compartment 92, the second inflatable compartment 94 and the third inflatable compartment 98 with the first partition fabric 66 and the second partition fabric 68. The portion between the upper fabric 64 of the airbag 56 and the first partition fabric 66 is the first inflatable compartment 92 which is to be deployed for the shoulder P1 of the occupant P. The portion between the first partition fabric 66 and the second partition fabric 68 is the second inflatable compartment 94 which is to be deployed for the abdomen (chest and abdomen) P2 of the occupant P. The portion between the second partition fabric 68 and the lower edge of the airbag 56 is the third inflatable compartment 98 which is to be deployed for the waist P3 of the occupant P.

The structures of the respective members (fabric members) of the airbag 56 will be described below. The first base fabric 60 and the second base fabric 62 constitute the right and left side surfaces of the airbag 56, and the first base fabric 60 and the second base fabric 62 constitute a bag when attached to each other at their peripheries.

As shown in FIG. 2, the first base fabric 60 and the second base fabric 62 are in a substantially identical shape, and have a height H and a length L sufficient to cover the side of the occupant P in the seat 4 of FIG. 4. More specifically, the inflated airbag 56 has a height sufficient to cover the shoulder P1 to the waist P3 of the occupant P, namely, the height H, and has a length sufficient to reach the shoulder P1 and the waist P3 or even the middle of the thigh P4 of the occupant P from the seatback 18, namely, the length L.

Figure 6:
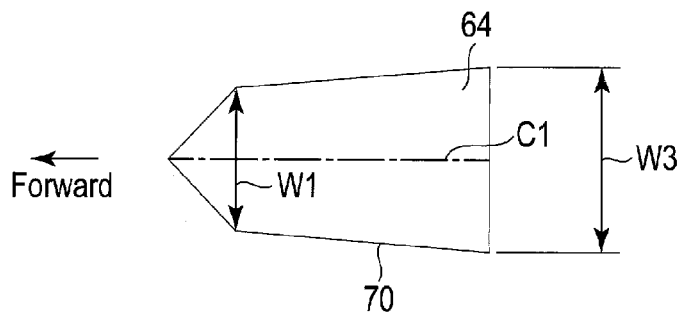
FIG. 6 is a plan view of an upper fabric of the airbag.

The upper fabric 64 is provided above the first base fabric 60 and the second base fabric 62 and constitutes the upper surface of the airbag 56. The upper fabric 64 is, as shown in FIG. 6, gradually tapered down in the forward direction so that a width W1 of the front portion becomes smaller than a width W3 of the back portion, and a rim 70 of the upper fabric 64 is attached to the upper edges 44 of the first base fabric 60 and the second base fabric 62. In FIG. 2, the upper fabric 64 is folded down along a center line C1 and is stored between the first base fabric 60 and the second base fabric 62. Note that the upper fabric 64 regulates the deployment width of the airbag 56 in such a manner that the upper surface of the airbag 56 becomes tapered down in the upper direction when the airbag 56 is deployed and inflated.

Figure 7:
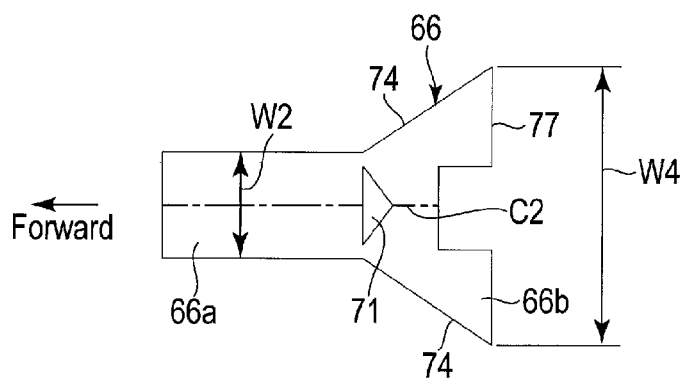
FIG. 7 is a plan view of a first partition fabric.

The first partition fabric 66 partitions into the first inflatable compartment 92 and the second inflatable compartment 94. The first partition fabric 66 comprises, as shown in FIG. 7, a front half portion 66a having a substantially constant width W2, a back half portion 66b located at the back of the front half portion 66a and having a width W4 gradually increasing toward the back end. The front half portion 66a has an almost-rectangular shape, and width W2 is less than width W1 of the front portion of the upper fabric 64. The back half portion 66b has an almost-triangular shape, and width W4 of the back end of the back half portion 66b is substantially the same as width W3 of the back end of the upper fabric 64. Here, the width W is assumed to be a dimension in the lateral direction in an unfolded, free state unless specifically described otherwise. The width in the description corresponds to the width in the claims.

The front half portion 66a and the back half portion 66b are attached to each other in such a manner that the respective center lines extending in the direction of travel of the vehicle will be the same straight line, that is, will be a center line C2 of the first partition fabric 66, and the right and left side edges 74 are attached respectively to the first base fabric 60 and the second base fabric 62. When attached to the first base fabric 60 and the second base fabric 62, the first partition fabric 66 is folded down along center line C2 in such a manner that the right and left side edges 74 in the front half portion 66a and in the back half portion 66b become straight. Further, the front and back edges of the first partition fabric 66 are also attached to the first base fabric 60 and the second base fabric 62.

The first partition fabric 66 is, as shown in FIGS. 1 and 2, provided below the discharge nozzle 80 of the gas generator 58. That is, as shown in FIG. 2, in a state where the airbag 56 is not deployed, the first partition fabric 66 is folded down along center line C2 in such a state where, when viewed from the side, the side edges 74 extend straight in the direction of travel of the vehicle but the center line C of the back half portion 66b slants downward. At the boundary of the front half portion 66a and the back half portion 66b of the first partition fabric 66, a port 71 which connects the first inflatable compartment 92 and the second inflatable compartment 94 is provided.

As shown in FIG. 7, the port 71 is formed in a linear shape on the side of the front half portion 66a and in a triangular shape having its apex on the side of the back half portion 66b. More specifically, the port 71 is an isosceles triangle symmetrical about center line C2 of the first partition fabric 66. The port 71 is formed in such a manner that, when the first partition fabric 66 is folded down along center line C2 in such a manner that the right and left side edges 74 extend straight, the front half portion 66a and the back half portion 66b will hardly overlap with each other. Note that a valve piece 78 is provided above the port 71 to cover the port 71.

The valve piece 78 is made of a piece of fabric, and as shown in FIG. 11, the port 71 has a size sufficient to cover the port 71 entirely and is overlaid on the first partition fabric 66. The valve piece 78 is in an almost-rhombic shape and is arranged in such a manner that a pair of corners E1 and E2 opposed to each other across the center point of the valve piece 78 is arranged on the lateral axis. Further, the valve piece 78 is attached to the first base fabric 60 and the second base fabric 62 at the pair of corners E1 and E2 arranged on the lateral axis.

Still further, the valve piece 78 is formed in such a manner that the length of the diagonal line of corners E1 and E2, namely, the width of the valve piece 78 is smaller than the width of a portion of the front half portion 66a of the first partition fabric 66 in which the port 71 is provided, namely, width W2. That is, the valve piece 78 is provided in such a manner as to be overlaid on the upper plane of the port 71 formed in a portion where the front half portion 66a and the back half portion 66b of the first partition fabric 66 are connected to each other, and is configured to regulate the deployment width of the airbag 56 in this portion.

Figure 10:
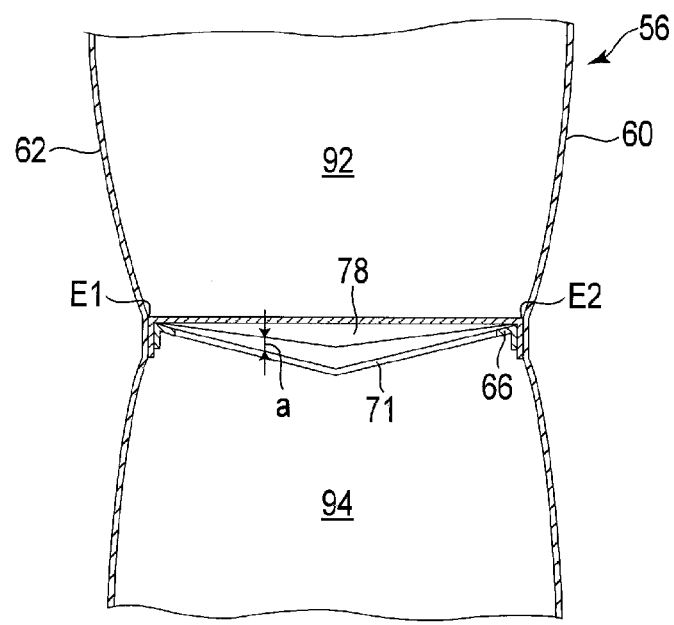
FIG. 10 is a cross-sectional view of the first partition fabric and the valve piece in a state where the first inflatable compartment is fully inflated.

In this way, as shown in FIG. 10, when the airbag 56 (the first inflatable compartment 92) is fully inflated, the portion of the first partition fabric 66 corresponding to the port 71 is in a sagging or slightly folded down state. Note that, in the valve piece 78, the other non-attached pair of corners E3 and E4 of the rhombus is arranged along the direction of travel of the vehicle and is arranged on center line C2 of the first partition fabric 66 when viewed from the above.

Figure 9:
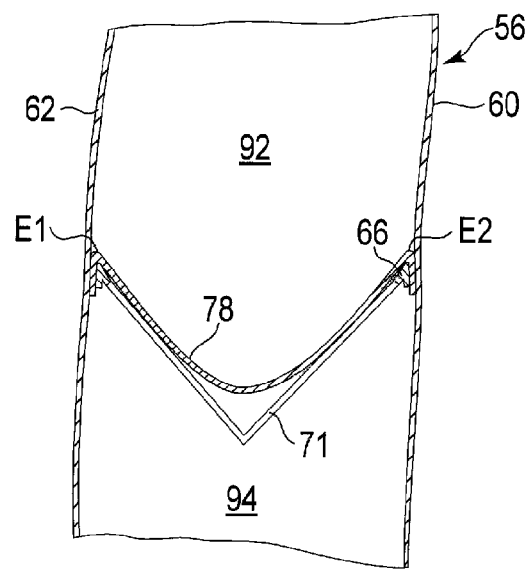
FIG. 9 is a cross-sectional view of the first partition fabric and a valve piece in a state where a first inflatable compartment of the airbag is in the middle of inflation.

Still further, the port 71 of the first partition fabric 66 and the valve piece 78 have the following function. As shown in FIGS. 9 and 11, when the first inflatable compartment 92 is in the middle of inflation, that is, when the gap between the first base fabric 60 and the second base fabric 62 is not great yet and the first partition fabric 66 is still in a folded state, the valve piece 78 sags, and as being pushed down by the pressure of the gas flowing in the first inflatable compartment 92, contacts the first partition fabric 66 in the periphery of the port 71. That is, the valve piece 78 is overlaid on the first partition fabric 66 in such a manner as to extend along the fold of the first partition fabric 62, and thus the valve piece 78 closes the port 71. Note that, at this time, corners E3 and E4 of the valve piece 78 fit in the fold line of the first partition fabric 66 (FIG. 11) and the space between the valve piece 78 and the first partition fabric 66 is completely closed.

Figure 12:
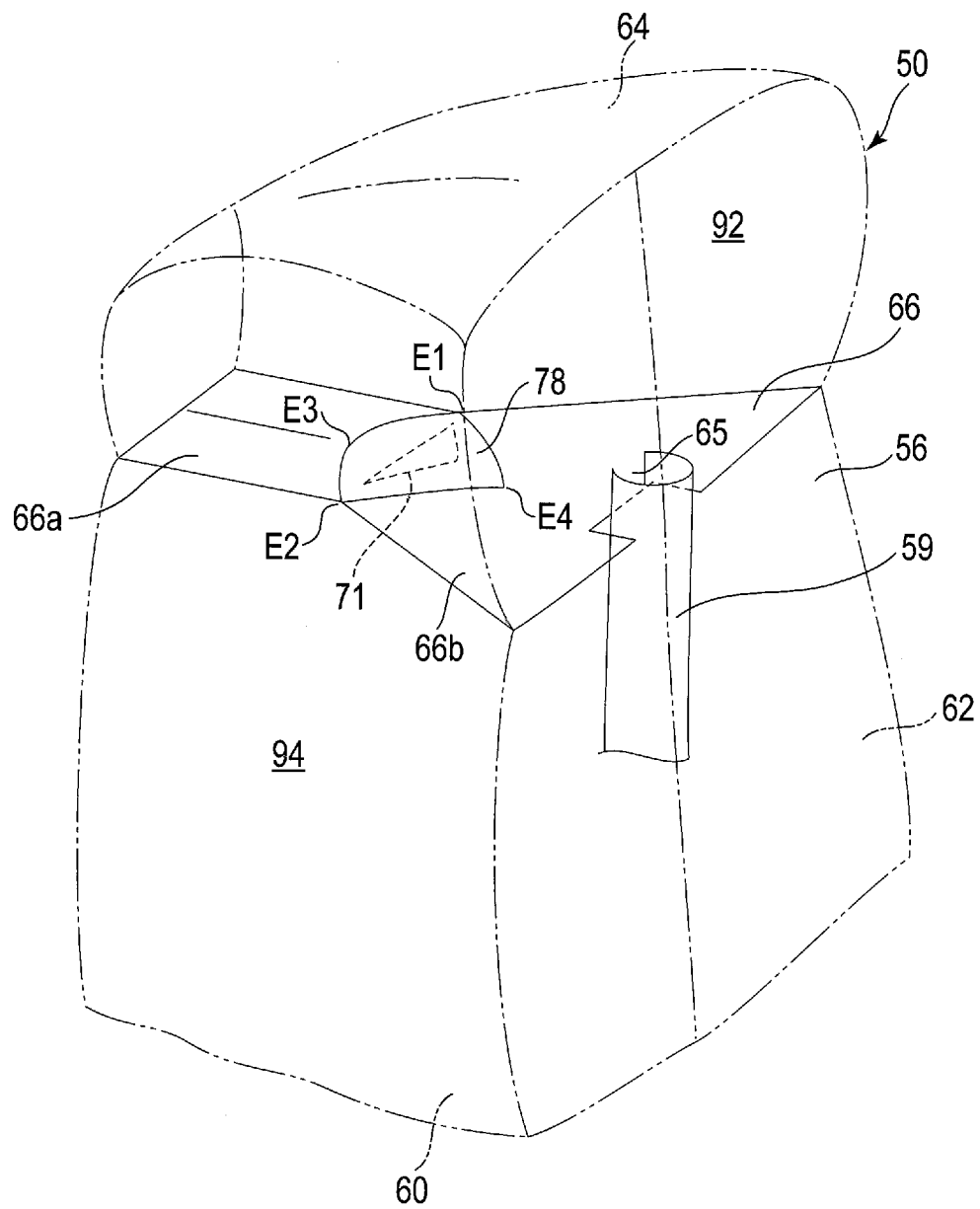
FIG. 12 is a perspective view of the side airbag in a state where the first inflatable compartment is fully inflated.

Then, as shown in FIGS. 10 and 12, when the first inflatable compartment 92 of the airbag 56 is fully inflated and the gap between the first base fabric 60 and the second base fabric 62 is great, before the first partition fabric 66 is pulled and stretched fully, the first partition fabric 66 is pulled and stretched up to the maximum width of the pair of corners E1 and E2. At this time, the valve piece 78 prevents the connecting portion of the front half portion 66a and the back half portion 66b of the first partition fabric 66 from stretching up to width W2, and thus the periphery of the port 71 of the first partition fabric 66 sags and a space a is formed between the first partition fabric 66 and the valve piece 78 as shown in FIG. 10. That is, since the port 71 will not be closed with the valve piece 78, the first inflatable compartment 92 and the second inflatable compartment 94 are connected to each other via the port 71.

In this way, the port 71 and the valve piece 78 constitute a valve mechanism in the first partition fabric 66 configured to open only when the first inflatable compartment 92 is fully inflated (the width reaches its maximum). Note that FIGS. 9 and 10 are cross-sectional views of the airbag 56 taken along the lateral axis in the portion of the port 71, and that FIG. 9 shows the first partition fabric 66 and the valve piece 78 in a state where the airbag 56 is in the middle of inflation and FIG. 10 shows the first partition fabric 66 and the valve piece 78 in a state where the airbag 56 is fully inflated. FIGS. 11 and 12 are perspective views of the airbag 56, and FIG. 11 shows the airbag 56 in an inflating state and FIG. 12 shows the airbag 56 in a fully inflated state.

Figure 8:
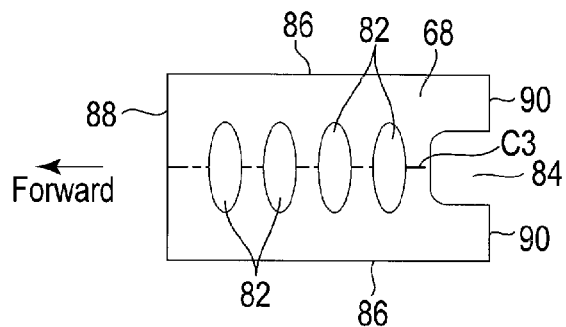
FIG. 8 is a plan view of a second partition fabric.

The second partition fabric 68 partitions into the second inflatable compartment 94 and the third inflatable compartment 98. As shown in FIG. 8, the second partition fabric 68 is in an almost-rectangular shape as a whole, comprises four cutout holes 82 and one notch 84 at the back end. The second partition fabric 68 is folded down along a center line C3, and at right and left side edges 86, the second partition fabric 68 is attached to the first base fabric 60 and the second base fabric 62. Further, a front edge 88 and back edges 90 of the second partition fabric 68 are, as folded along center line C3, attached to the first base fabric 60 and the second base fabric 62.

The tubular member 59 is a tubular member vertically extending along the back end of the airbag 56 and accommodates the gas generator 58 therein. The upper portion of the tubular member 59 is located above the first partition fabric 66, and opens in the first inflatable compartment 92. Further, the upper portion of the tubular member 59 comprises a notch 65 in a position corresponding to the discharge nozzle 80 on the front side. That is, the tubular member 59 has a structure of discharging the gas forward from the gas generator 58. The lower portion of tubular member 59 (hereinafter referred to as a lower opening portion 63) is located below the second partition fabric 68, and opens in the third inflatable compartment 98.

Figure 13:
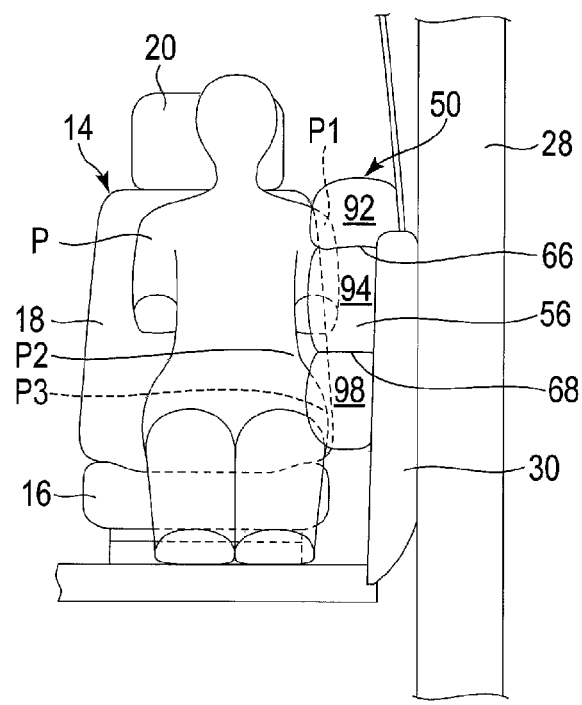
FIG. 13 is a front view of a state where the airbag is deployed when an occupant of an average body size is in the seat.
Figure 14:
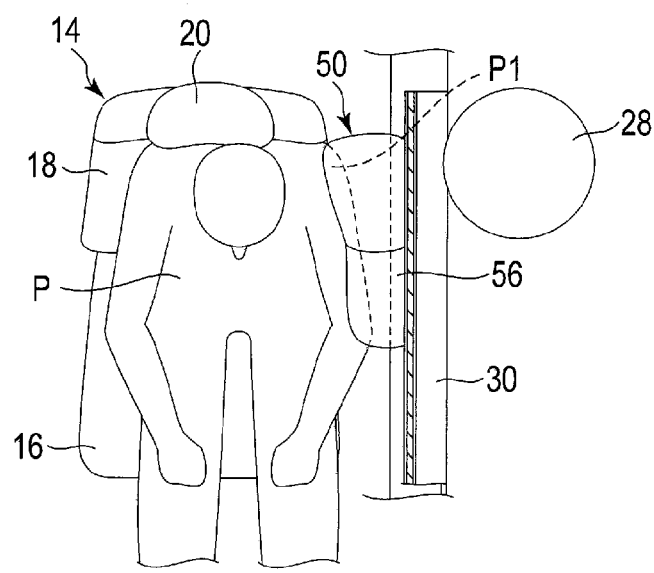
FIG. 14 is a plan view of a state where the airbag is deployed when an occupant of an average body size is in the seat.

Next, the function and the effect of the side airbag device 10 will be described with reference to FIGS. 9 to 16. FIGS. 13 and 14 are front and plan views of a state where the door 30 has collided with a columnar obstacle 28, that is, a state where the vehicle has laterally collided with the columnar obstacle 28.

When the vehicle laterally collides with the columnar obstacle 28, the collision detector 52 (FIGS. 1 and 2) detects acceleration produced at the instant of the collision, and transmits the detected value to the controller 54. When determining that, for example, the lateral acceleration value exceeds a threshold value, the controller 54 transmits an operation signal to the gas generator 58. Then, on receiving the operation signal, the gas generator 58 comes into operation to discharge gas from the discharge nozzle 80.

In a state where the airbag 56 is folded and accommodated in the seatback 18, the first partition fabric 66 is located below the discharge nozzle 80. Therefore, the gas discharged from the discharge nozzle 80 flows into the first inflatable compartment 92 and inflates the first inflatable compartment 92. Further, at the same time, the gas discharged from the discharge nozzle 80 passes through the space between the tubular member 59 and the gas generator 58, flows into the third inflatable compartment 98 from the lower opening portion 63, and inflates the third inflatable compartment 98.

Since a great amount of gas is supplied to the first inflatable compartment 92, the first inflatable compartment 92 is immediately inflated to receive the shoulder P1 of the occupant P. Further, since the discharge nozzle 80 faces forward, the first inflatable compartment 92 inflates forward and the airbag 56 inflates between the occupant P and the door 30 at the side of the seat 14. When the first inflatable compartment 92 inflates and the gap between the first base fabric 60 and the second base fabric 62 becomes great, the first partition fabric 66 is pulled and stretched accordingly.

In the middle of the inflation of the first inflatable compartment 92, as shown in FIGS. 9 and 11, the first partition fabric 66 is folded down, and the valve piece 78 is overlaid on the first partition fabric 66 in such a manner as to extend along the fold of the first partition fabric 66. Therefore, the valve piece 78 contacts the periphery of the port 71 and closes the port 71. Consequently, the gas supplied to the first inflatable compartment 92 will not flow into the second inflatable compartment 94 through the port 71 but will continue inflating the first inflatable compartment 92.

Then, when the first inflatable compartment 92 is inflated to the extent that the valve piece 78 is pulled up to the maximum width, as shown in FIGS. 10 and 12, the valve piece 78 is pulled linearly between the attachment portions at corners E1 and E2, but since the portion of the first partition fabric 66 corresponding to the port 71 sags, the space a is formed between the valve piece 78 and the port 71, and consequently the first inflatable compartment 92 and the second inflatable compartment 94 are connected to each other via the port 71. In this state, the inner pressure of the first inflatable compartment 92 is higher than the inner pressure of the second inflatable compartment 94, and thus the gas in the first inflatable compartment 92 passes through the port 71 from the space a and flows into the second inflatable compartment 94.

Further, the gas having fully filled the third inflatable compartment 98 then flows into the second inflatable compartment 94 through the cutout holes 82 and inflates the second inflatable compartment 94. Since the width of the second partition fabric 68 is greater than the width of the first partition fabric 66, as shown in FIG. 3, the second inflatable compartment 94 inflates more laterally than the first inflatable compartment 92.

Therefore, in the beginning when the gas generator 58 generates gas, the gas flows into the first inflatable compartment 92 and inflates the first inflatable compartment 92. Then, when the first inflatable compartment 92 is almost fully inflated, the port 71 is released from the valve piece 78, and then the gas flows from the first inflatable compartment 92 to the second inflatable compartment 94 and starts inflating the second inflatable compartment 94.

In this way, the side airbag device 10 first inflates the first inflatable compartment 92 for the shoulder P1 and thereby protects the shoulder P1 closest to the door 30. The inflated first inflatable compartment 92 has, as shown in FIG. 7, when viewed from above, a broader width at the back and a constant width from the center to the front, and thus the first inflatable compartment 92 can reliably receive the shoulder P1 of the occupant P. Further, the third inflatable compartment 98 inflates to protect the waist P3 of the occupant P, and then the second inflatable compartment 94 inflates to protect the abdomen (the chest and the abdomen) P2 of the occupant P.

It is preferable that the first partition fabric 66 should be in close contact with the first base fabric 60 and the second base fabric 62 at the respective edges, should be also in close contact with the tubular member 59, and should have as less portions as possible other than the port 71 which connect the first inflatable compartment 92 and the second inflatable compartment 94.

Further, the side airbag device 10 of the present application having the above-described structure can appropriately protect the occupant P according to the body size of the occupant P. That is, the side airbag device 10 of the present application has a structure that the first inflatable compartment 92 of the airbag 56 functions differently for occupants having different body sizes such as an occupant having a relatively large body size, that is, having a body size greater than an average size and an occupant having a relatively small body size.

Figure 15:
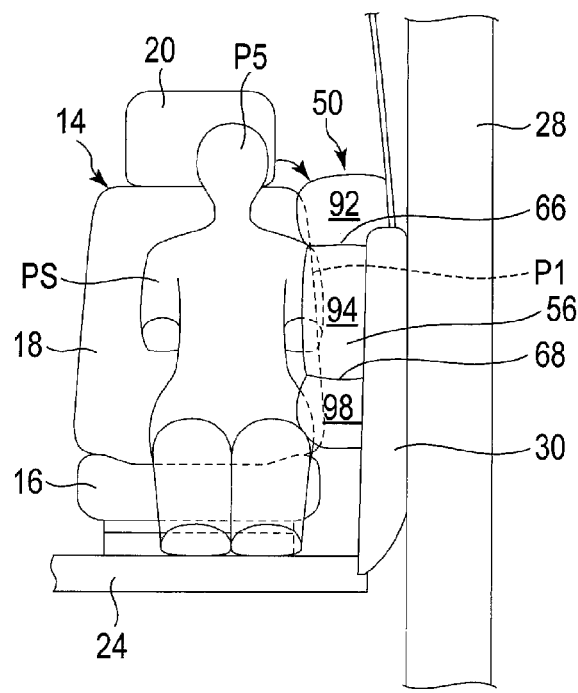
FIG. 15 is a front view of a state where the airbag is deployed when a relatively small occupant is in the seat.
Figure 16:
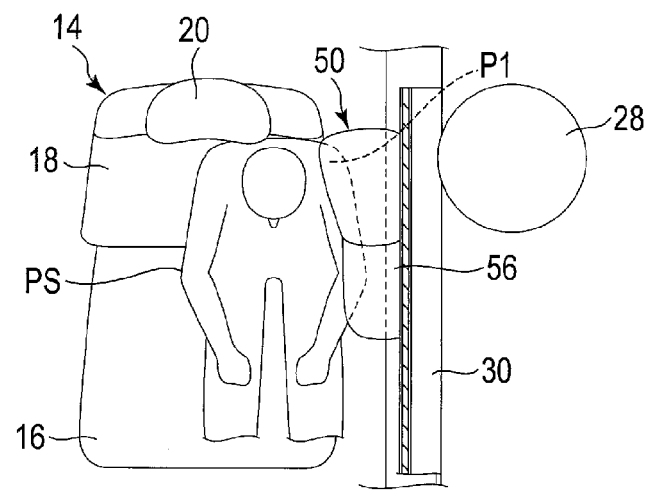
FIG. 16 is a plan view of a state where the airbag is deployed when a relatively small occupant is in the seat.

Next, this point will be described in detail. Note that, in the following description, the occupant having a body size greater than an average body size will be referred to as an occupant P and the occupant having a relatively small body size will be referred to as an occupant PS, thereby differentiating these two occupants. Further, FIGS. 13 and 14 are a front view and a plan view of the fully inflated airbag 56 in a state where the relatively large occupant P is seated, and FIGS. 15 and 16 are a front view and a plan view of the fully inflated airbag 56 in a state where the relatively small occupant PS is seated.

As shown in FIGS. 13 and 14, when the relatively large occupant P is in the seat 14, the distance between the occupant P and the door 30 is small, and therefore in the event of a lateral collision, the occupant P will contact the first inflatable compartment 92 before the first inflatable compartment 92 is fully inflated. That is, in the middle of inflation, the first inflatable compartment 92 is blocked laterally by the occupant P.

At this time, as shown in FIGS. 9 and 11, the first partition fabric 66 is a sagging or folded down state. Since the valve piece 78 is not fully pulled and stretched yet, the valve piece 78 covers the port 71 and closes the port 71.

Here, as shown in FIG. 11, the pair of corners E3 and E4 of the valve piece 78 fits in the fold line of the first partition fabric 66, and thus the space between the valve piece 78 and the first partition fabric 66 is completely closed. Note that the valve piece 78 is strongly pressed against the first partition fabric 66 by the pressure of the gas supplied to the first inflatable compartment 92. Therefore, the gas in the first inflatable compartment 92 will not pass through the port 71 but the inner pressure of the first inflatable compartment 92 will be maintained.

Consequently, the first inflatable compartment 92 maintains a sufficient reactive force on the relatively large occupant P. In this way, the side airbag device 10 can protect the shoulder P1 of the relatively large occupant P, that is, the shoulder P1 located at a relatively short distance from the door 30.

On the other hand, as shown in FIGS. 15 and 16, when the relatively small occupant PS is in the seat 14, the distance between the occupant PS and the door 30 is great, and therefore it takes time for the occupant PS to contact the airbag 56. Therefore, the occupant PS will contact the first inflatable compartment 92 after the first inflatable compartment 92 is fully inflated.

That is, as shown in FIGS. 10 and 12, in the airbag 56, the valve piece 78 is pulled and stretched up to the maximum width of the pair of corners E1 and E2 but the first partition fabric 66 sags, and thus the space a is formed between the port 71 and the valve piece 78. Consequently, the first inflatable compartment 92 and the second inflatable compartment 92 are connected to each other via the port 71, and the gas flows from the first inflatable compartment 92 to the second inflatable compartment 94 through the port 71.

In this way, the inner pressure of the first inflatable compartment 92 decreases, and thus the reactive force of the first inflatable compartment 92 on the occupant PS can be reduced. Therefore, it is possible to protect the relatively small occupant PS, for example, the shoulder P1 of a small woman or the like while reducing the impact thereon.

Further, as shown in FIG. 15, there is a case where the head 5 of the relatively small occupant PS is located near the first inflatable compartment 92. In such a case, the head may hit the first inflatable compartment 92, but since the inner pressure of the first inflatable compartment 92 decreases by that time, the impact of the airbag 56 on the head P5 can be reduced.

As described above, the side airbag device 10 of the present embodiment has the following technical effect. When the airbag 56 is deployed in the event of a lateral collision of a vehicle, the first inflatable compartment 92 is inflated first. Therefore, even when the shoulder P1 approaches the door 30 in a short time after the collision, the first inflatable compartment 92 in a position corresponding to the shoulder P1 of the occupant P is inflated immediately to protect the shoulder P1 reliably.

Since the first inflatable compartment 92 is formed of the upper fabric 64 and the first partition fabric 66 and has such a shape that the upper portion and the back portion are wider than the lower portion and the front portion, the first inflatable compartment 92 has an appropriate thickness to protect the shoulder P1 more reliably. Further, in addition to the relatively large occupant P, it is also possible to protect the relatively small occupant PS by decreasing the pressure of the airbag 56 and reducing the impact on the occupant PS, that is, it is possible to reliably protect the occupant P (PS) according to the body size of the occupant.

The first inflatable compartment 92 and the third inflatable compartment 98 are inflated in succession, and after the first inflatable compartment 92 and the third inflatable compartment 98 are fully inflated, the second inflatable compartment 94 for the abdomen (the chest and the abdomen) P2 of the occupant P is inflated. Therefore, the shoulder P1, the waist P3 and the abdomen (the chest and the abdomen) P2 of the occupant P are protected in this order.

Since there is a distance between the abdomen (the chest and the abdomen) P2 and the door 30 regardless of the body size of the occupant P, it is possible to appropriately protect the abdomen (the chest and the abdomen) P2 even by inflating the second inflatable compartment 94 after the first inflatable compartment 92 and the third inflatable compartment 98. Further, since the fully inflated second inflatable compartment 94 is wider than the fully inflated first inflatable compartment 92, it is possible to protect the abdomen (the chest and the abdomen) P2 reliably.

Since the valve piece 78 switches from the inflation of the first inflatable compartment 92 to the inflation of the second inflatable compartment 94 based on the degree of inflation in the first base fabric 60 and the second base fabric 62, it is possible to keep the structure simple and the cost down. Further, since the airbag 56 is symmetrical and the side airbag device 10 is attachable to either side of the seat 14, it is possible to keep the structure simpler.

Second Embodiment

Next, a side airbag device of the second embodiment will be described. Except for a first partition fabric 100 different from the first partition fabric 66 of the side airbag device 10 of the first embodiment, a side airbag device 11 of the second embodiment has a structure basically similar to that of the side airbag device 10 of the first embodiment, and produces substantially the same technical effect. In the following description, structural elements the same as those of the first embodiment will be denoted by the same reference numbers and detailed description thereof will be omitted.

The first partition fabric 100 of the side airbag device 11 is shown in FIG. 17. The first partition fabric 100 comprises, as in the case of the first partition fabric 66 of the first embodiment, a rectangular front half portion 100a and an almost-triangular back half portion 100b. At the boundary of the front half portion 100a and the back half portion 100b, the back half portion 100b is partly overlaid on the front half portion 100a, thereby forming an overlapping portion 102. Further, the first partition fabric 100 is attached to the first base fabric 60 and the second base fabric 62 in a state of being folded down along a center line C4 in such a manner that the right and left side edges 104 in the front half portion 100a and in the back half portion 100b become straight.

In the overlapping portion 102, the front half portion 100a and the back half portion 100b are attached to each other only at the right and left ends, and the middle portion between the front half portion 100a and the back half portion 100b is open. Further, the front half portion 100a and the back half portion 100b are basically overlapping with each other, but a width W5 of the front half portion 100a is slightly greater than a width W6 of the back half portion 100b in the overlapping portion 102.

Next, the function and the effect of the side airbag device 11 will be described. On detecting a lateral collision, the side airbag device 11 in a state of being accommodated in the seatback 18 supplies gas to the airbag 56 and inflates the first inflatable compartment 92 first. As the first inflatable compartment 92 inflates, the gap between the first base fabric 60 and the second base fabric 62 increases, and the first partition fabric 100 is laterally pulled and stretched, accordingly. Here, when the airbag 56 (the first inflatable compartment 92) is in the middle of inflation, since the first partition fabric 100 is not pulled and stretched up to the maximum width yet, the first partition fabric 100 is in a sagging or folded down state. Therefore, in the overlapping portion 102, the front half portion 100a and the back half portion 100b overlap with each other, and the space therebetween is closed.

Then, as the first inflatable compartment 92 further inflates, a third partition fabric 76 is pulled and stretched by the first base fabric 60 and the second base fabric 62, and the overlapping portion 102 is pulled and stretched, accordingly. When the overlapping portion 102 is fully pulled and stretched, the back half portion 100b of width W6 is strained but the front half portion 100a of width W5 still sags, and the sag creates a space between the front half portion 100a and the back half portion 100b.

Therefore, in the side airbag device 11, the space in the overlapping portion 102 between the front half portion 100a and the back half portion 100b will be closed or the gas will not flow from the first inflatable compartment 92 into the second inflatable compartment 94 through the space until the first inflatable compartment 92 fully inflates. Consequently, the first inflatable compartment 92 inflates before the second inflatable compartment 94.

Then, when the first inflatable compartment 92 fully inflates, the space is formed in the overlapping portion 102 between the first half portion 100a and the back half portion 100b, and thus the gas flows from the first inflatable compartment 92 into the second inflatable compartment 94 through the space formed in the overlapping portion 102, and the second inflatable compartment 94 inflates. That is, in the side airbag device 11, the valve mechanism is formed in a portion where the front half portion 100a and the back half portion 100b of the first partition fabric 100 overlap with each other, namely, the overlapping portion 102.

Therefore, even in the side airbag device 11, it is possible to protect the shoulder P1 by immediately inflating the first inflatable compartment 92 in a manner similar to that of the side airbag 10. Further, even in the case of the occupant P having a different body size, it is possible to provide protection according to the body size by appropriately adjusting the inflation of the first inflatable compartment 92 and the inflation of the second inflatable compartment 94 using the overlapping portion 102 in a manner similar to that of the side airbag device 10.

The present invention is applicable to a side airbag device comprising an airbag to be deployed between an occupant and a door.

REFERENCE SIGNS LIST

10: Side airbag device, 14: Seat, 16: Seat cushion, 18: Seatback, 30: Door, 36: Window glass, 50: Airbag module, 52: Collision detector, 54: Controller, 56: Airbag, 58: Gas generator, 60: First base fabric, 62: Second base fabric, 64: Upper fabric, 66: First partition fabric of first embodiment, 66a: Front half portion, 66b: Back half portion, 68: Second partition fabric, 71: port, 78: Valve piece, 80: Discharge nozzle, 92: First inflatable compartment, 94: Second inflatable compartment, 98: Third inflatable compartment, 100: First partition fabric of second embodiment, 100a: Front half portion, 100b: Back half portion, 102: Overlapping portion, 28: Columnar obstacle, P: Occupant (having body size greater than average body size), PS: Relatively small occupant, P1: Shoulder, P2: Abdomen (chest and abdomen), P3: Waist, P4: Thigh, P5: Head

What is claimed is:

1. A side airbag device installed in a vehicle seat and configured to deploy an airbag between an occupant and a door, the air bag comprising:

a first base fabric constituting one of right and left side surfaces of the airbag opposed to each other in a lateral direction;

a second base fabric opposed to the first base fabric, constituting the other of the right and left side surfaces of the airbag, and constituting an inflatable envelope together with the first base fabric;

a partition fabric provided between the first base fabric and the second base fabric, attached to the first base fabric and the second base fabric at side edges, and partitioning the inflatable envelope into a first inflatable compartment and a second inflatable compartment located below the first inflatable compartment; and a valve mechanism provided in the partition fabric and configured to open to connect the first inflatable compartment and the second inflatable compartment only when the first inflatable compartment is fully inflated.

2. The side airbag device of claim 1, wherein the valve mechanism comprises a port provided in the partition fabric and connecting the first inflatable compartment and the second inflatable compartment to each other, and a valve piece overlaid on an upper plane of the port of the partition fabric, covering the port, and attached to the first base fabric and the second base fabric, and the valve piece has a width smaller than a width of a portion of the partition fabric in which the port is provided.

3. The side airbag device of claim 2, wherein the partition fabric comprises a front half portion formed in a shape of a rectangular having a constant width and a back half portion having a width gradually increasing toward its back end, and the port is formed at a boundary of the front half portion and the back half portion.

4. The side airbag device of claim 3, wherein the partition fabric is provided between the first base fabric and the second base fabric in a state of being folded down along a center line extending in the direction of travel of the vehicle, and the valve piece is formed in a shape of a rhombus, arranged in a manner in the airbag that pairs of corners are opposed to each other respectively in the lateral direction and the direction of travel of the vehicle, comprising one pair of corners opposed to each other in the lateral direction and attached to the first base fabric and the second base fabric, and comprising the other pair of corners opposed to each other in the direction of travel of the vehicle and arranged on the center line of the partition fabric.

5. The side airbag device of claim 2, wherein the partition fabric is provided between the first base fabric and the second base fabric in a state of being folded down along a center line extending in the direction of travel of the vehicle, and the valve piece is formed in a shape of a rhombus, arranged in a manner in the airbag that pairs of corners are opposed to each other respectively in the lateral direction and the direction of travel of the vehicle, comprising one pair of corners opposed to each other in the lateral direction and attached to the first base fabric and the second base fabric, and comprising the other pair of corners opposed to each other in the direction of travel of the vehicle and arranged on the center line of the partition fabric.

6. The side airbag device of claim 1, wherein the partition fabric comprises a front half portion and a back half portion behind the front half portion, an overlapping portion is formed at a boundary of the front half portion and the back half portion in which the front half portion is partly overlaid on the back half portion and a middle portion between the front half portion and the back half portion is open, and the overlapping portion is configured to function as the valve mechanism when a width of the front half portion in the overlapping portion is set to be greater than a width of the back half portion.

* * * * *